United States Patent
Cadigan et al.

(10) Patent No.: US 10,684,968 B2
(45) Date of Patent: Jun. 16, 2020

(54) CONDITIONAL MEMORY SPREADING FOR HETEROGENEOUS MEMORY SIZES

(71) Applicant: International Business Machines Corporation, Armonk, NY (US)

(72) Inventors: David D. Cadigan, Danbury, CT (US); Thomas J. Dewkett, Staatsburg, NY (US); Glenn D. Gilda, Binghamton, NY (US); Patrick J. Meaney, Poughkeepsie, NY (US); Craig R. Walters, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 47 days.

(21) Appl. No.: 15/623,960

(22) Filed: Jun. 15, 2017

(65) Prior Publication Data

US 2018/0365177 A1 Dec. 20, 2018

(51) Int. Cl.
*G06F 13/16* (2006.01)

(52) U.S. Cl.
CPC ...... *G06F 13/1684* (2013.01); *G06F 13/1647* (2013.01)

(58) Field of Classification Search
CPC .......................... G06F 13/1684; G06F 13/1647
USPC .......................... 710/20, 29, 33, 40, 308, 310
See application file for complete search history.

(56) References Cited

U.S. PATENT DOCUMENTS

| | | | | |
|---|---|---|---|---|
| 4,528,624 A | * | 7/1985 | Kamionka | G06F 3/0601 711/153 |
| 4,855,899 A | * | 8/1989 | Presant | G06F 9/4881 710/36 |
| 6,134,605 A | * | 10/2000 | Hudson | G06F 9/3879 710/13 |
| 6,381,715 B1 | | 4/2002 | Bauman et al. | |
| 6,714,960 B1 | * | 3/2004 | Bitar | G06F 9/4881 718/103 |
| 6,735,769 B1 | * | 5/2004 | Brenner | G06F 9/3836 711/133 |
| 6,782,461 B2 | * | 8/2004 | Lam | G06F 5/065 710/54 |
| 6,918,005 B1 | * | 7/2005 | Marchant | G06F 12/023 710/54 |
| 8,533,403 B1 | * | 9/2013 | Law | G06F 13/1605 711/151 |
| 8,612,711 B1 | * | 12/2013 | Griffin | G06F 9/5022 711/165 |
| 9,411,718 B2 | * | 8/2016 | Cohen | G06F 12/0246 |
| 10,095,533 B1 | * | 10/2018 | Dravid | G06F 9/50 |
| 2002/0118206 A1 | | 8/2002 | Knittel | |
| 2005/0246508 A1 | | 11/2005 | Shaw | |

(Continued)

*Primary Examiner* — Idriss N Alrobaye
*Assistant Examiner* — Henry W Yu
(74) *Attorney, Agent, or Firm* — Cantor Colburn LLP; William Kinnaman

(57) ABSTRACT

A processor implemented method for spreading data traffic across memory controllers with respect to conditions is provided. The processor implemented method includes determining whether the memory controllers are balanced. The processor implemented method includes executing a conditional spreading with respect to the conditions when the memory controllers are determined as unbalanced. The processor implemented method includes executing an equal spreading when the memory controllers are determined as balanced.

18 Claims, 6 Drawing Sheets

(56) References Cited

U.S. PATENT DOCUMENTS

| | | | |
|---|---|---|---|
| 2006/0036518 A1* | 2/2006 | O'Neill | G06Q 20/102 705/30 |
| 2006/0095592 A1* | 5/2006 | Borkenhagen | G06F 13/1673 710/2 |
| 2006/0206661 A1 | 9/2006 | Gaither | |
| 2009/0248941 A1* | 10/2009 | Morein | G06F 13/4265 710/308 |
| 2010/0042759 A1* | 2/2010 | Srinivasan | G06F 12/0607 710/35 |
| 2010/0106922 A1* | 4/2010 | Thyagarajan | H04L 1/0001 711/157 |
| 2011/0320698 A1* | 12/2011 | Wang | G06F 13/1663 711/105 |
| 2012/0054423 A1* | 3/2012 | Wang | G06F 13/1647 711/105 |
| 2014/0019579 A1* | 1/2014 | Motwani | H04L 29/08549 709/216 |

* cited by examiner

| Memory Configuration | MC-1 | MC-2 | MC-3 | MC-4 |
|---|---|---|---|---|
| 1 |  | 64 | 32 | 32 |
| 2 |  | 64 | 64 | 64 |
| 3 |  | 128 | 64 | 64 |
| 4 |  | 128 | 128 | 64 |
| 5 |  | 128 | 128 | 128 |
| 6 | 64 | 128 | 128 | 128 |
| 7 | 128 | 128 | 128 | 128 |

FIG. 2

|  | MC-1 (X) | MC-2 (64) | MC-3 (32) | MC-4 (32) | Utilization |
|---|---|---|---|---|---|
| Equal Spreading | X | A D G ... | B E H ... | C F I ... | 33% (first assigned partitions) |
|  | X | A B C ... | X | X | 100% (last assigned partitions) |
| Proportional Memory Spreading | X | A C E G ... | B F | D H | 25% (MC-3, MC-4) 50% (MC-2) Consistently |

FIG. 3

CONDITIONAL MEMORY SPREADING FOR HETEROGENEOUS MEMORY SIZES

BACKGROUND

The disclosure relates generally to conditional memory spreading for heterogeneous memory sizes.

In a symmetric multiprocessing computer system with processors and input/output (I/O), cache and memory hierarchy is designed to provide low latency and high bandwidth. When it comes to volatile, dynamic random access memory (DRAM) (e.g. dual in-line memory modules (DIMMs)), there are several factors to consider when designing the cache and memory hierarchy: intrinsic memory latency and performance (e.g. unloaded latency), queuing, and background operations (e.g., refresh/scrubbing/periodics). Queuing can adversely affect memory bandwidth. To minimize queuing, memory spreading can be included in the cache and memory hierarchy design.

In general, the symmetric multiprocessing computer system utilizes internal memory resources by spreading equally data traffic to portions of the internal memory resources. While evenly spreading data traffic across memory controllers often works for uniform DIMM sizes, when mixed DIMM sizes are used, this contemporary equal spreading can cause an unbalanced use of the internal memory resources, as each portion of the internal memory receives the same amount of data traffic regardless of availability and/or capability. The unbalanced use of the internal memory resources often results in uneven and inconsistent workload behaviors of the internal memory resources, along with pathological queuing issues as internal memory resources fill up that degrade memory performance.

SUMMARY

According to one or more embodiments, a processor-implemented method for spreading data traffic across memory controllers with respect to conditions is provided. The processor-implemented method includes determining whether the memory controllers are balanced. The processor-implemented method includes executing a conditional spreading with respect to the conditions when the memory controllers are determined as unbalanced. The processor-implemented method includes executing an equal spreading when the memory controllers are determined as balanced.

According to one or more embodiments, a processor-implemented method can be implemented in a computer program product and/or a system.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

FIG. 2 depicts a table providing seven possible memory configurations for a system in accordance with one or more embodiments;

FIG. 3 depicts a table providing a comparison between equal spreading and conditional spreading operations in accordance with one or more embodiments;

DETAILED DESCRIPTION

In view of the above, embodiments disclosed herein may include system, method, and/or computer program product (herein system) that spreads data traffic across memory controllers with respect to one or more conditions (i.e., conditional spreading). By utilizing conditional spreading over contemporary equal spreading, the system enables each memory control unit to receive an amount of use with respect to the one or more conditions, thereby eliminating the unbalanced memory use by the contemporary equal spreading that causes performance degradation as noted herein.

Embodiments described herein are necessarily rooted in a processor and memory of the system to perform proactive operations to overcome problems specifically arising in the realm of memory spreading in a heterogeneous environment (e.g., these problems include the unbalanced memory use, resulting in unwanted performance costs and expenses). Thus, the technical effects and benefits of conditional spreading include higher efficiencies in memory use and a reduction in memory queuing.

Figure 1:
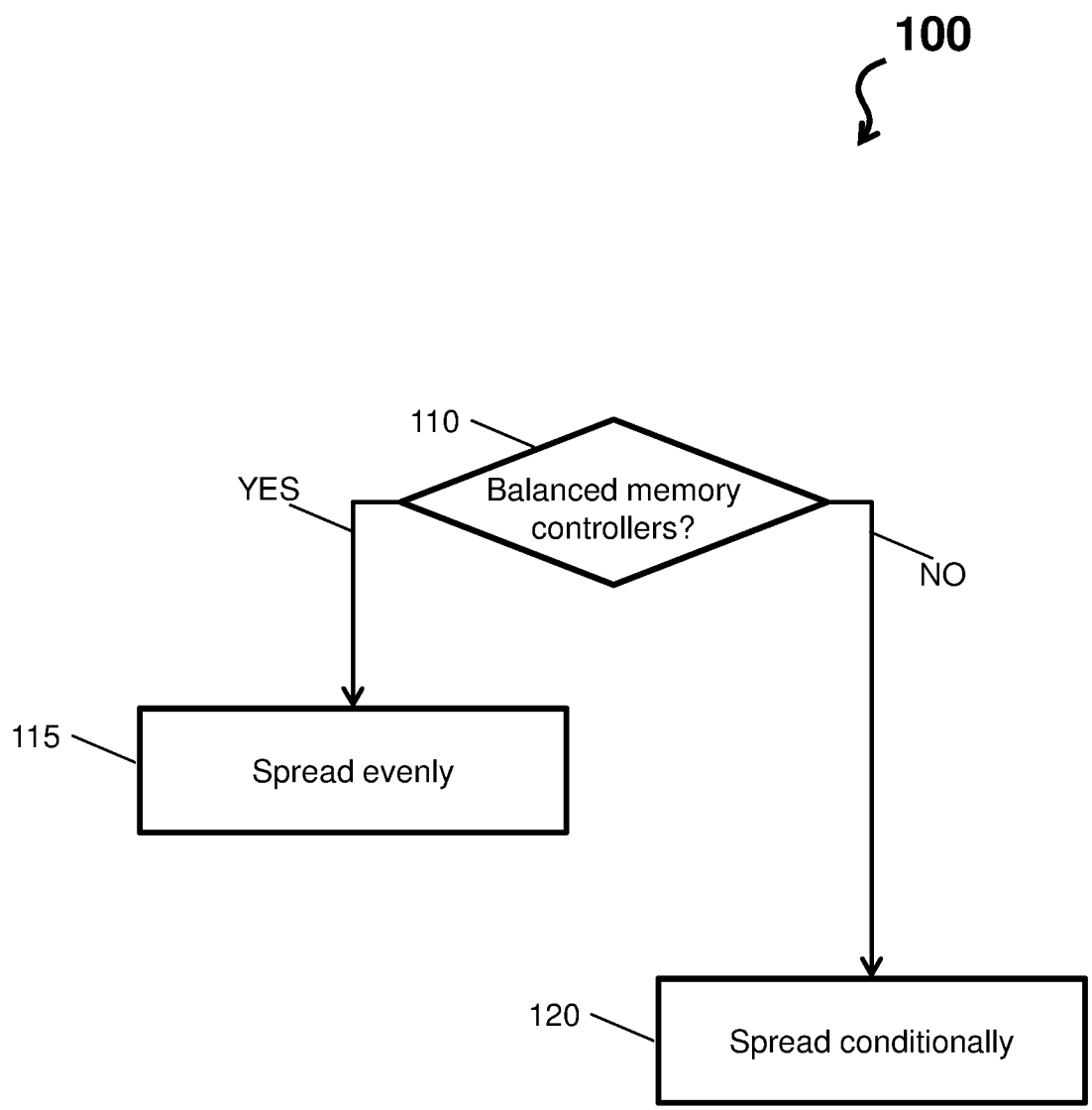
FIG. 1 depicts a process flow of a system in accordance with one or more embodiments.

Turning now to FIG. 1, a process flow 100 is generally shown in accordance with an embodiment. The process flow 100 is an operational example of conditional spreading in the system described herein. The system can be an electronic, computer framework comprising and/or employing any number and combination of computing device and networks utilizing various communication technologies, as described herein. The system can be easily scalable, extensible, and modular, with the ability to change to different services or reconfigure some features independently of others.

The system can comprise a memory. The memory can be any level of a memory hierarchy, such as memory controllers, memory control units, ranks, banks, etc. Herein for ease of explanation, the system is described with reference to memory controllers, but is not limited thereto. FIG. 2 depicts a table 200 providing seven possible memory configurations for the system in accordance with one or more embodiments. The seven possible memory configurations are shown in table 200 as Memory Configurations 1-7, as noted in the first column. Each of these Memory Configurations 1-7 further provides a memory size with respect to four memory controllers (MC-1, MC-2, MC-3, and MC-4, as noted in the header row columns two through four).

The process flow 100 begins at decision block 110, where the system determines if the memory controllers are balanced. The memory controllers are considered balanced when an available space is the same for each of the memory controllers. If the memory controllers are balanced, the process flow 100 proceeds to block 115 (as shown by the YES arrow). At block 115, the system spreads data traffic evenly across the memory controllers.

If the memory controllers are unbalanced, the process flow 100 proceeds to block 120 (as shown by the NO arrow). For example, utilizing the Memory Configuration 1 of FIG. 2, the system can determine that MC-2 is providing 64 gigabytes, MC-3 is providing 32 gigabytes, and MC-4 is providing 32 gigabytes (note that MC-1 is not providing memory to Memory Configuration 1). Because MC-2 is providing twice as much memory as MC-3 and MC-4, the memory controllers are unbalanced.

At block 120, the system spreads the data traffic conditionally across the memory controllers (e.g., with respect to one or more conditions). The one or more conditions can include spreading memory proportionally to a memory installed (e.g., proportional memory spreading), proportionally to a remaining available memory (e.g., available memory spreading), and/or with job priority consideration (e.g., job memory spreading).

An example of the proportional memory spreading includes when two memory controllers (i.e., first and second) are installed in the system. The first memory control unit is twice the size of the second memory control unit. Then, the first memory control unit proportionally receives twice as much as traffic as the second memory control unit. Turning now to FIG. 3, a table 300 is shown depicting a comparison between equal spreading and conditional spreading operations in accordance with one or more embodiments. The table 300 particularly shows the Memory Configuration 1 of FIG. 2 with respect to equal spreading and conditional spreading operations.

Regarding the equal spreading operation, the data traffic is interleaved to the memory controllers MC-2, MC-3, and MC-4 (in such a way that the systems achieves as much spreading as it can while it can). Under the Memory Configuration 1 of FIG. 2 and using equal spreading memory allocation as shown in FIG. 3, the memory controllers MC-2, MC-3, and MC-4 each receive memory segment allocations evenly distributed as shown by assignments of memory segments A, B, C, D, E, F, G, H, and I. Assuming an even data traffic distribution across memory segments, then each MCU receives 33% of the data traffic. However, once the memory controllers MC-3 and MC-4 are filled, then the memory controller MC-2 receives 100% of additional memory segment allocations and also the corresponding data traffic. The data traffic sent to memory controller MC-2 then can experience extreme latency.

Regarding the conditional spreading operation, the memory controller MC-2 is twice as large (64 gigabytes) as the memory controllers MC-3 and MC-4 (32 gigabytes each). Given this 2:1 ratio, the system can proportionally spread two jobs to the memory controller MC-2 for every one job sent to each of the memory controllers MC-3 and MC-4 (i.e., proportionally provide data traffic distribution). In turn, the memory controllers MC-2, MC-3, and MC-4 consistency fill up at the same rate without a latency issue as seen when the memory controller MC-2 receives 100% during equal spreading operation.

An example of the available memory spreading includes when two memory controllers (i.e., first and second) are installed in the system. The first memory control unit is three times the size of the second memory control unit. A third of the first memory control unit is unavailable due to being preassigned. The second memory control unit is available. Then, the first memory control unit proportionally receives twice as much as traffic as the second memory control unit because the available amount of the first memory control unit is twice the size of the available amount of the second memory control unit. The available memory spreading can be considered an embodiment that analyses remaining memory versus total memory. Note that as memory fills up and/or becomes available, the system can reevaluate the proportions to balance the rate of data traffic distribution.

Figure 4:
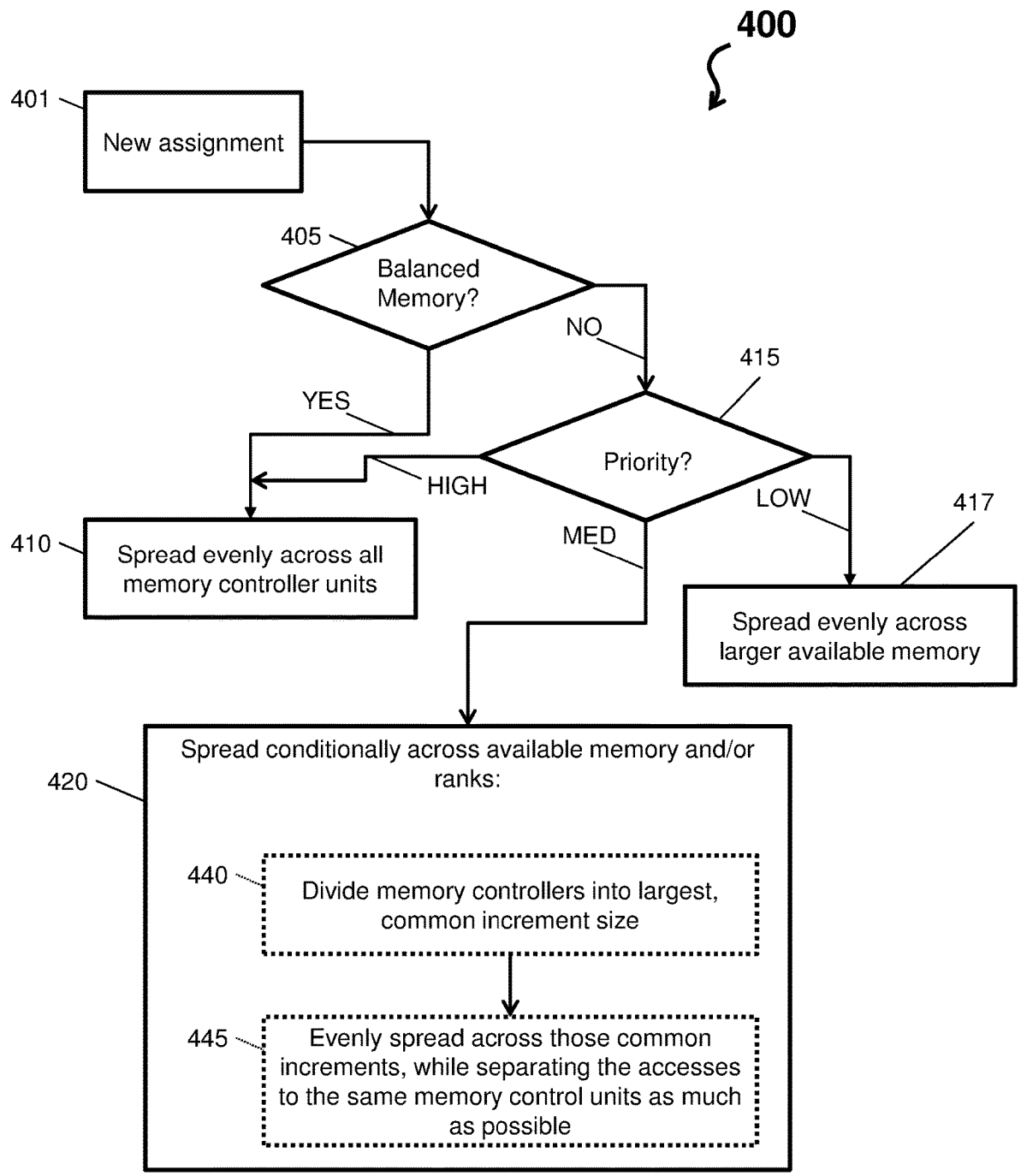
FIG. 4 depicts a process flow of a system in accordance with one or more embodiments.

An example of the job memory spreading includes a maximum spreading for high performance partitions and proportional spreading on lower performance partitions. Turning now to FIG. 4, a process flow 400 is generally shown in accordance with an embodiment. The process flow 400 is an operational example of job memory spreading in the system described herein. In this example, the system can include memory control units MCU-1, MCU-2, MCU-3, and MCU-4, some or all of which may have installed memory.

The process flow 400 begins at block 401, where a new assignment is received by the system. At decision block 405, the system determines if the memory control units MCU-1, MCU-2, MCU-3, and MCU-4 have installed memory, and if so, are balanced. If the memory control units MCU-1, MCU-2, MCU-3, and MCU-4 which have installed memory are balanced, the process flow 400 proceeds to decision block 410 (as shown by the YES arrow). At block 410, the system spreads data traffic evenly across the memory control units MCU-1, MCU-2, MCU-3, and MCU-4.

Returning to decision block 405, if the memory control units MCU-1, MCU-2, MCU-3, and MCU-4 which have installed memory are not balanced, the process flow 400 proceeds to block 415 (as shown by the NO arrow). At block 415, the system can spread the new assignment based on a priority of the new assignment. In a non-limiting embodiment, the system can utilize a multi-tiered priority structure. For instance, the system can use first, second, and third priorities to determine how to spread the new assignment. When the new assignment is assigned a first or low priority, the process flow 400 proceeds to block 417 (as shown by the LOW arrow) so that the new assignment can be spread to the larger partition of the unbalanced memory to use up the excess memory (allowing higher priority assignment to receive more efficient spreading operations). When the new assignments is assigned a third or high priority, the process flow 400 proceeds to block 410 (as shown by the HIGH arrow) so that the new assignment can use maximum spreading. When the new assignment is assigned a second or medium priority, the process flow 400 proceeds to block 420 (as shown by the MED arrow) so that the new assignment can use memory spreading proportional to available memory.

Figure 5:
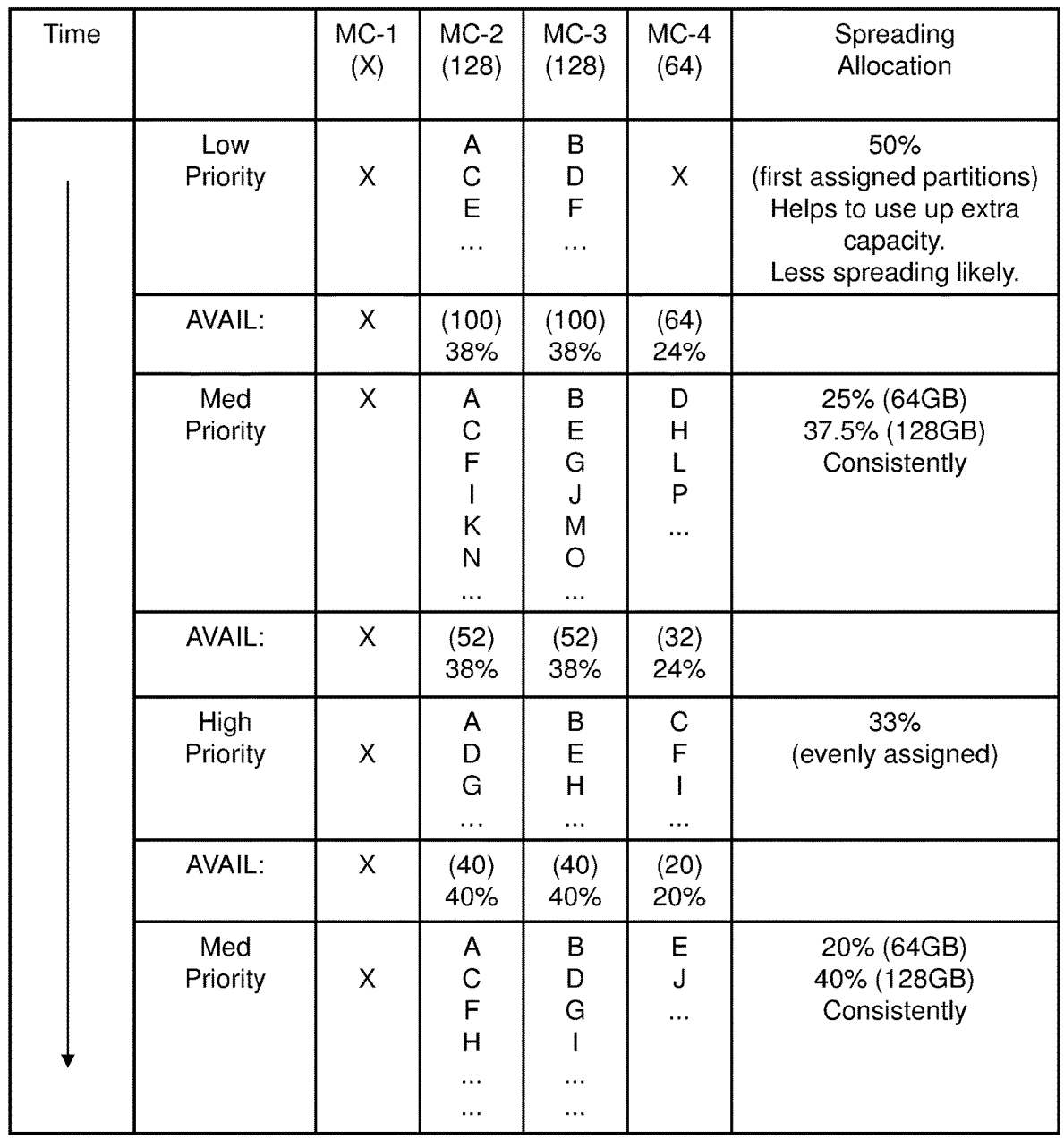
FIG. 5 depicts a table providing spreading operations in accordance with one or more embodiments.

At block 420, the system spreads the data traffic conditionally across the memory controllers (e.g., with respect to available memory and/or ranks). The sub-process of block 420 is further described with respect to blocks 440 and 445. At dotted-block 440, the system divides the memory control units into a largest common increment size. Turning now to FIG. 5, a table 500 is depicted. The table 500 shows an example of how memory allocation occurs using the different priorities described in FIG. 4 as time progresses for four memory control units MC-1, MC-2, MC-3, and MC-4. Note that the memory control unit MC-1 is unavailable, the memory control units MC-2 and 3 are of equal size (e.g., 128), and the memory control unit MC-4 is half the size of one of the memory control units MC-2 and MC-3.

For the first row in table 500 labeled as Low Priority, memory segment assignment occurs based on total installed memory on each MC since no memory allocation has occurred yet. All memory segments are allocated to MC-2 and MC-3, consistent with block 417 in FIG. 4. As shown in table 500, there is a 50% spreading utilization for these low priority assignments.

The next row in table 500 labeled AVAIL shows the amount of remaining memory in MC-2, MC-3 and MC-4 after completion of the low priority workload. The next row in table 500 then shows a switch to memory allocation for a medium priority workload. Allocation for medium priority workload is based on available memory, consistent with block 420 in FIG. 4. The largest common increment size is 64 gigabytes on MC-4. MC-2 and MC-3 have 200 gigabytes available and so can accommodate three 64 gigabyte increments. Memory allocation then proceeds by alternately allocating 3 memory segments to MC-2 and MC-3 and then allocating a fourth memory segment to MC-4. This allocation results in a 37.5% utilization for MC-2 and MC-3, and a 25% allocation to MC-4 for medium priority assignments in this example.

The next AVAIL row in table 600 shows the remaining available memory after completion of this medium priority allocation. A high priority workload then proceeds and allocates memory with maximum spreading consistent with block 410 in FIG. 4. This allocation results in 33% utilization for MC-2, MC-3 and MC-4

The next AVAIL row in table 500 shows remaining memory after completion of the high priority workload. A new medium priority workload begins, and now the largest common increment size is 20 gigabytes. MC-2 and MC-3 can now accommodate 4 of these segments, and so memory allocation now proceeds by assigning alternately 4 segments to MC-2 and MC-3 for every 1 segment assigned to MC-4.

Thus, the system enables higher priority and lower/medium assignments to mix and to more effectively use the available memory with a more optimal performance.

In view of the above, the conditional spreading can include an embodiment where data traffic is spread proportionally to the installed memory (e.g., at whatever level spreading is performed, which in an embodiment is typically performed at a node level). The conditional spreading can include an embodiment where data traffic is spread in a hierarchical manner. An embodiment may have a collection of memory controllers on a node which consists of central processing (CP) chips each including a memory controller. Additionally, the node may include memory DIMMs and a system controller (SC) chip. Another configuration may entail sharing of an SC chip between two clusters of CP chips with their associated memory controllers and memory DIMMS. A drawer may then consist of either multiple nodes or clusters. Memory spreading can then occur first to a drawer, then to a node or cluster, then across a memory controller according to installed memory and/or remaining memory.

Further, the conditional spreading can include an embodiment where the system uses low bandwidth but high capacity memory to fill heterogeneous gaps, and then spreads according to remaining memory. The conditional spreading can include an embodiment where the system treats a system kernel evenly across memory controllers, and then spreads memory segments across remaining memory in the memory controllers proportional to the remaining memory. The conditional spreading can include an embodiment where the system allows for a difference in source vs. destination spreading (e.g., when moving memory segments from one topology to the next, use the destination topology to re-optimize the spreading).

The conditional spreading can include an embodiment where the system keeps an original spreading capability on a move memory operation. The conditional spreading can include an embodiment where the system spreads over a close proximity ratio that considers locality (e.g., memory controllers that are far apart may cause latency and are thus avoided to achieve cluster spreading).

Figure 6:
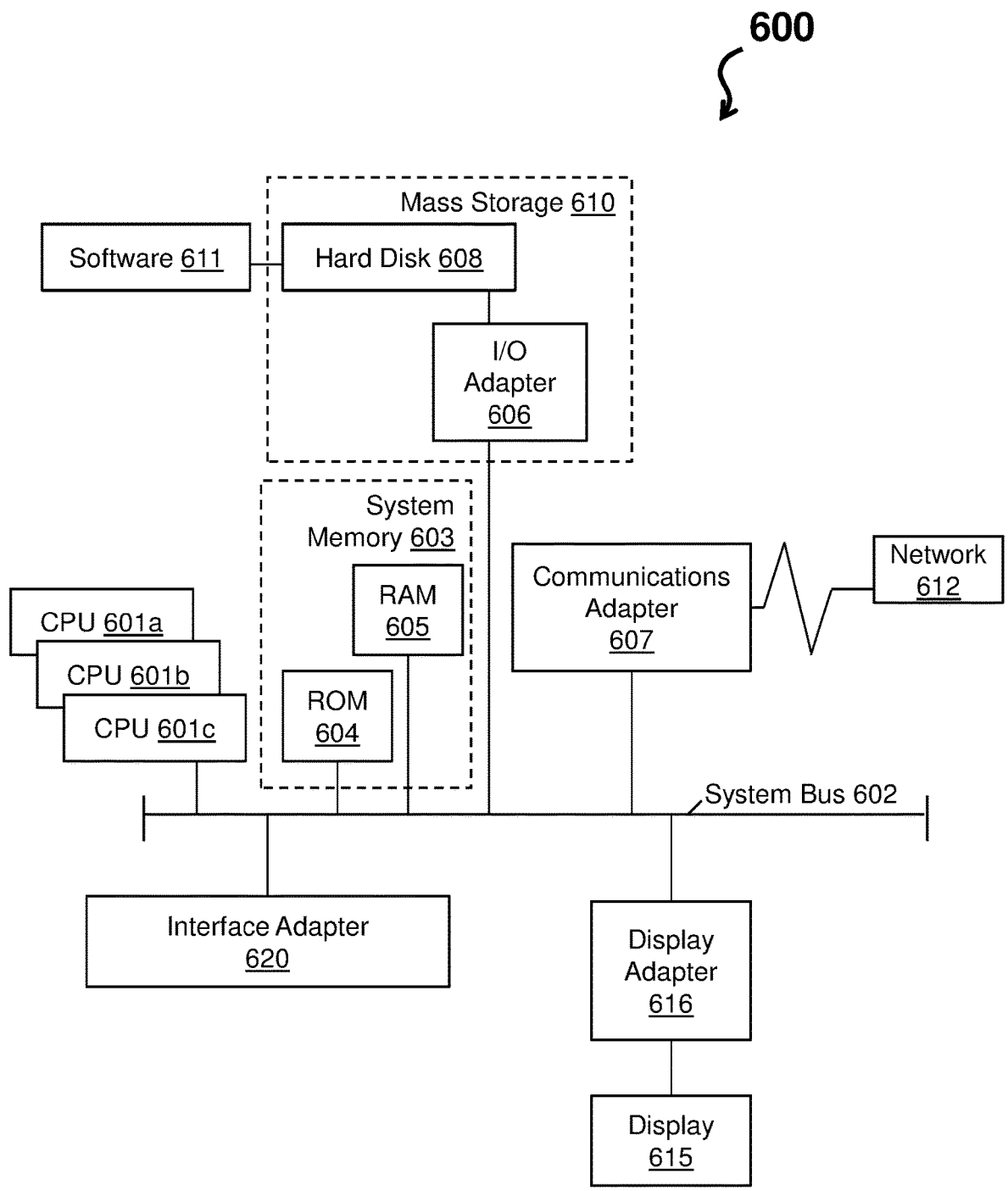
FIG. 6 depicts a processing system in accordance with one or more embodiments.

FIG. 6 depicts an example of a system 600 in accordance with one or more embodiments. The system 600 has one or more central processing units (CPU(s)) 601a, 601b, 601c, etc. (collectively or generically referred to as processor(s) 601). The processors 601, also referred to as processing circuits, are coupled via a system bus 602 to system memory 603 and various other components. The system memory 603 can include a read only memory (ROM) 604 and a random access memory (RAM) 605. Memory controllers may be part of either processors 601 or system memory 603. The ROM 604 is coupled to the system bus 602 and may include a basic input/output system (BIOS), which controls certain basic functions of the system 600. The RAM is read-write memory coupled to the system bus 602 for use by the processors 601.

FIG. 6 further depicts an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610. A software 611 for execution on the system 600 may be stored in the mass storage 610. The mass storage 610 is an example of a tangible storage medium readable by the processors 601, where the software 611 is stored as instructions for execution by the processors 601 to cause the system 600 to operate, such as is described herein with reference to FIGS. 2 and 4. Examples of computer program product and the execution of such instruction is discussed herein in more detail. Referring again to FIG. 6, a communications adapter 607 interconnects the system bus 602 with a network 612, which may be an outside network, enabling the system 600 to communicate with other such systems. A display (e.g., screen, a display monitor) 615 is connected to the system bus 602 by a display adapter 616, which may include a graphics controller to improve the performance of graphics intensive applications and a video controller. In one embodiment, the adapters 606, 607, and 616 may be connected to one or more I/O buses that are connected to the system bus 602 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 602 via an interface adapter 620 and the display adapter 616. A keyboard, a mouse, a speaker, etc. can be interconnected to the system bus 602 via the interface adapter 620, which may include, for example, a Super I/O chip integrating multiple device adapters into a single integrated circuit.

Thus, as configured in FIG. 6, the system 600 includes processing capability in the form of the processors 601, and, storage capability including the system memory 603 and the mass storage 610, input means such as the keyboard and the mouse, and output capability including the speaker and the display 615. In one embodiment, a portion of the system memory 603 and the mass storage 610 collectively store an operating system, such as the z/OS or AIX operating system from IBM Corporation, to coordinate the functions of the various components shown in FIG. 6.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for spreading data traffic across memory controllers with respect to one or more conditions, the processor-implemented method comprising:
   determining, by a processor, whether the memory controllers are balanced;
   determining, by the processor and in response to the memory controller being determined as unbalanced, a priority of incoming data traffic;
   executing, by the processor, a conditional spreading with respect to the one or more conditions when the memory controllers are determined as unbalanced and the incoming data traffic is a medium priority,
   wherein the processor divides an available space on the memory controllers into a largest common increment size to provide common increments and proportionally spreads the data traffic across the common increments based on the incoming data traffic being a medium priority, and
   wherein the memory controllers are considered unbalanced when an available space is different for at least one of the memory controllers with respect to any remaining memory controller;
   executing, by the processor, an equal spreading when the memory controllers are determined as balanced unbalanced and the incoming data traffic is determined to be a high priority;
   analyzing, during the equal spreading step, a proportion of available memory to total memory; and
   adjusting a rate of data traffic based on the proportion.

2. The processor-implemented method of claim 1, wherein the memory controllers are considered balanced when an available space is the same for each of the memory controllers.

3. The processor-implemented method of claim 1, wherein the equal spreading is an interleaving of data traffic evenly across the memory controllers.

4. The processor-implemented method of claim 1, wherein the conditional spreading includes a proportional memory spreading responsive to the one or more conditions.

5. The processor-implemented method of claim 1, wherein the conditional spreading includes available memory spreading responsive to the one or more conditions.

6. The processor-implemented method of claim 1, wherein the conditional spreading includes a job memory spreading responsive to the one or more conditions.

7. A computer program product for spreading data traffic across memory controllers with respect to one or more conditions, the computer program product comprising a computer readable storage medium having program instructions embodied therewith, the program instructions executable by a processor to cause the processor to:
   determine whether the memory controllers are balanced;
   determine, in response to the memory controller being determined as unbalanced, a priority of incoming data traffic;
   execute a conditional spreading with respect to the one or more conditions when the memory controllers are determined as unbalanced and the incoming data traffic is a medium priority,
   wherein the processor divides an available space on the memory controllers into a largest common increment size to provide common increments and proportionally spreads the data traffic across the common increments based on the incoming data traffic being a medium priority, and
   wherein the memory controllers are considered unbalanced when an available space is different for at least one of the memory controllers with respect to any remaining memory controller;
   execute an equal spreading when the memory controllers are determined as balanced and the incoming data traffic is determined to be a high priority;
   analyze, during the equal spreading step, a proportion of available memory to total memory; and
   adjust a rate of data traffic based on the proportion.

8. The computer program product of claim 7, wherein the memory controllers are considered balanced when an available space is the same for each of the memory controllers.

9. The computer program product of claim 7, wherein the equal spreading is an interleaving of data traffic evenly across the memory controllers.

10. The computer program product of claim 7, wherein the conditional spreading includes a proportional memory spreading responsive to the one or more conditions.

11. The computer program product of claim 7, wherein the conditional spreading includes available memory spreading responsive to the one or more conditions.

12. The computer program product of claim 7, wherein the conditional spreading includes a job memory spreading responsive to the one or more conditions.

13. A system, comprising a processor and a memory storing program instructions for spreading data traffic across memory controllers with respect to one or more conditions thereon, the program instructions executable by a processor to cause the system to perform:
   determine whether the memory controllers are balanced;
   determine, in response to the memory controller being determined as unbalanced, a priority of incoming data traffic;
   execute a conditional spreading with respect to the one or more conditions when the memory controllers are determined as unbalanced and the incoming data traffic is a medium priority,
   wherein the processor divides an available space on the memory controllers into a largest common increment size to provide common increments and proportionally spreads the data traffic across the common increments based on the incoming data traffic being a medium priority, and
   wherein the memory controllers are considered unbalanced when an available space is different for at least one of the memory controllers with respect to any remaining memory controller;
   execute an equal spreading when the memory controllers are determined as balanced and the incoming data traffic is a high priority;
   analyze, during the equal spreading step, a proportion of available memory to total memory; and
   adjust a rate of data traffic based on the proportion.

14. The system of claim 13, wherein the memory controllers are considered balanced when an available space is the same for each of the memory controllers.

15. The system of claim 13, wherein the equal spreading is an interleaving of data traffic evenly across the memory controllers.

16. The system of claim 13, wherein the conditional spreading includes a proportional memory spreading responsive to the one or more conditions.

17. The system of claim 13, wherein the conditional spreading includes available memory spreading responsive to the one or more conditions.

18. The system of claim 13, wherein the conditional spreading includes a job memory spreading responsive to the one or more conditions.

\* \* \* \* \*